United States Patent [19]
Dionne, deceased Robert A. et al.

[11] Patent Number: 5,114,656
[45] Date of Patent: May 19, 1992

[54] METHOD OF FORMING PACKAGING MATERIAL

[76] Inventor: Robert A. Dionne, deceased, late of Martinsville, Va., by Pauline E. Dionne, administratrix, 1620 Meadowview La., Martinsville, Va. 24112

[21] Appl. No.: 512,532

[22] Filed: Apr. 18, 1990

Related U.S. Application Data

[63] Continuation of Ser. No. 60,257, Jul. 17, 1987, abandoned.

[51] Int. Cl.⁵ .............................. B29C 67/20
[52] U.S. Cl. ................................ 264/321; 264/51
[58] Field of Search ............. 264/321, DIG. 4, 51, 264/53

[56] References Cited

U.S. PATENT DOCUMENTS

| | | | |
|---|---|---|---|
| 2,767,436 | 10/1956 | Noland et al. | 264/321 |
| 2,899,708 | 8/1959 | Donaldson et al. | 264/321 X |
| 3,082,483 | 3/1963 | Bickford | 264/321 |
| 3,119,147 | 1/1964 | Kracht | 264/DIG. 4 |
| 3,159,700 | 12/1964 | Nakamura | 264/321 |
| 3,200,437 | 8/1965 | Sasanko | 264/DIG. 4 |
| 3,244,346 | 4/1966 | Tijunelis | 264/DIG. 4 |
| 3,334,169 | 8/1967 | Erceg et al. | 264/321 |
| 3,445,406 | 5/1969 | Koch | 264/321 X |
| 3,459,274 | 8/1969 | MacPhail, Sr. | 264/321 X |
| 3,670,064 | 6/1972 | Edwards et al. | 264/321 X |
| 3,676,033 | 7/1972 | Buonaiuto | 264/321 X |
| 4,017,927 | 4/1977 | Massey | 264/DIG. 4 |
| 4,105,738 | 8/1978 | Rhon | 264/DIG. 4 |
| 4,424,180 | 1/1984 | Lalloz et al. | 264/321 X |
| 4,505,662 | 3/1985 | Hay, II | 264/321 X |
| 4,510,268 | 4/1985 | Tonokawa et al. | 264/321 X |

FOREIGN PATENT DOCUMENTS

| | | | |
|---|---|---|---|
| 2230921 | 1/1973 | Fed. Rep. of Germany | 264/321 |
| 2333631 | 7/1977 | France | 264/51 |
| 781046 | 8/1957 | United Kingdom | 264/321 |

Primary Examiner—Hubert C. Lorin
Attorney, Agent, or Firm—Rhodes, Coats & Bennett

[57] ABSTRACT

An improved packaging material wherein a block, sheet or molded packaging material formed of molded expanded polystyrene is compressed under controlled conditions to increase the density of the packaging material and thereby increasing the deflection qualities and resiliency of the material.

10 Claims, 7 Drawing Sheets

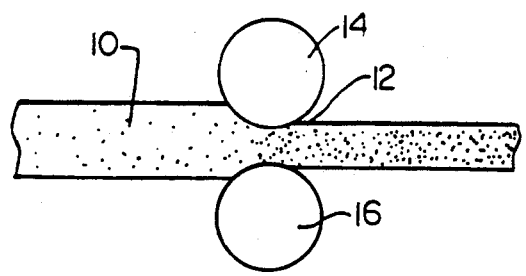
FIG. 1
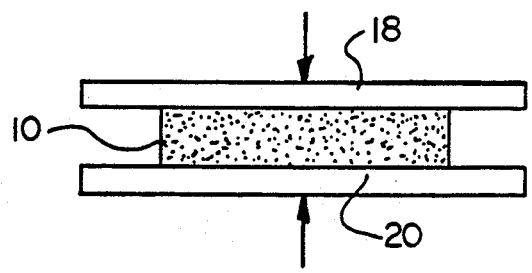
FIG. 2
FIG. 3
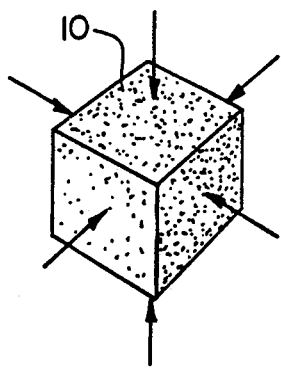
FIG. 4
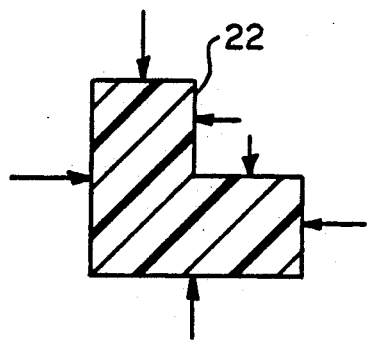

LOSS VS. DIMENSION OF COMPRESSION
●————● 50% DEFLECTION AT 1 MINUTE

DURAFORM VS. STANDARD EPS IN CUSHION CURVE
●————● DURAFOAM (50% DEF, 1 MINUTE)
■--------■ STANDARD 1.0 # PCF EPS

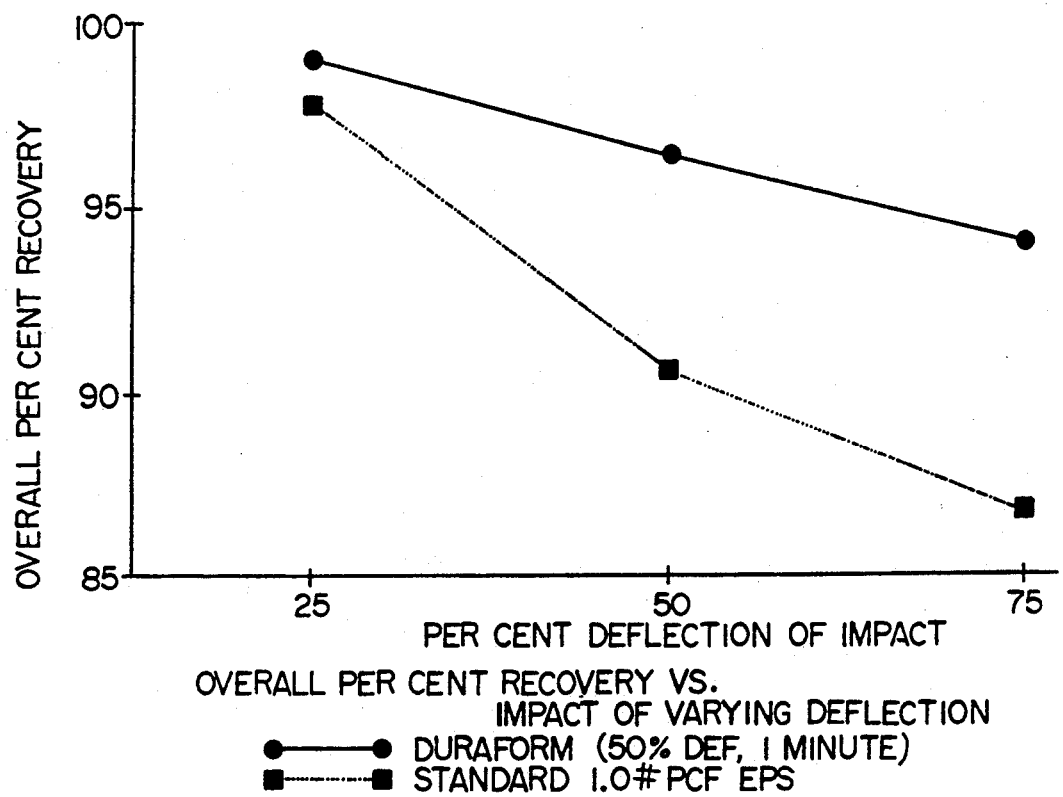

METHOD OF FORMING PACKAGING MATERIAL

This application is a continuation of application Ser. No. 060,257, filed Jul. 17, 1987, now abandoned.

This invention relates in general to packaging materials, and more particularly to an expanded polystyrene (EPS) material which has been specially treated to increase the cushion qualities and resiliency thereof.

EPS is a known packaging material and packaging components may be molded to shape or cut from thick molded blocks.

In accordance with this invention, it has been found that by compressing standard molded EPS at different ranges of deflection in varying duration and/or dimension, an enhanced packaging product is yielded that will provide superior protection in packaging applications as compared to that of standard EPS. This invention relates to such packaging material and the method of forming the same.

BACKGROUND

Molded EPS is a closed cell light-weight foam plastic formed of Styrenic Hydrocarbon. It is manufactured by placing polystyrene beads, containing a blowing agent, into a mold and exposing them to heat. The heat causes the blowing agent to expand the beads, which fuse together to form a large block from which packaging members are cut. As an alternative, the mold may be in accordance with the packaging element configuration. The molded material is measured in terms of pounds per cubic foot density (pcf).

The mechanical properties of molded EPS depend largely upon density in general, with strength characteristics increasing with density. However, such variables such as the grade of raw material used, geometry of the molded part and processing conditions will affect packaging properties and performance. It is to be understood that variables inherent to any test specimen may result in properties varying $\pm 10$–$15\%$ from listed values.

Molded EPS is an effective, economical packaging medium for foodstuffs, pharmaceuticals and other perishables which must be shipped and stored under thermally controlled environments. EPS is highly resistant to heat flow, with its uniform, closed cellular structure limiting radiant, convective and conductive heat transfer. The thermal conductivity (k factor) of molded EPS is known to vary with density and exposure temperature.

The cellular structure of molded EPS is essentially impermeable to water and provides zero capillarity. However, due to the fine interstitial channels within the bead-like structure, moisture may be absorbed under total immersion. Although molded EPS is relatively impermeable to liquid water, it is moderately permeable to vapors under pressure differentials. Vapor permeability is a function of both density and thickness. However, generally speaking, neither water nor water vapor affects the mechanical properties of EPS.

Molded EPS is an inert, organic material. It provides no nutritive value to plants, animals or micro-organisms. It will not rot, and is highly resistant to mildew.

Molded EPS is unaffected by water and aqueous solutions of salts, acids and alkalis. Most organic solvents are not compatible with molded EPS and this must be considered when selecting adhesives, labels and coatings for direct application thereto.

As stated above, this invention relates to standard molded EPS which at room temperature is compressed at different ranges of deflection in varying duration and/or dimension to provide an enhanced packaging product.

With the above and other objects in view that will hereinafter appear, the nature of the invention will be more clearly understood by reference to the following detailed description, the appended claims, and the several views illustrated in the accompanying drawings.

FIG. 1 is a schematic side elevational view showing a block of EPS being compressed by passing the same through a nip defined by two rollers.

FIG. 2 is a schematic side elevational view showing a block of EPS being compressed between two flat surfaces.

FIG. 3 is a schematic perspective view of a cube of EPS which is compressed in all three dimensions.

FIG. 4 is a sectional view taken through a corner packaging member showing the manner in which it may be compressed in two dimensions.

FIG. 12 is a graphical representation of a comparison of the resiliency of the present invention to standard, uncompressed 1.0# pcf EPS.

Figure 5:
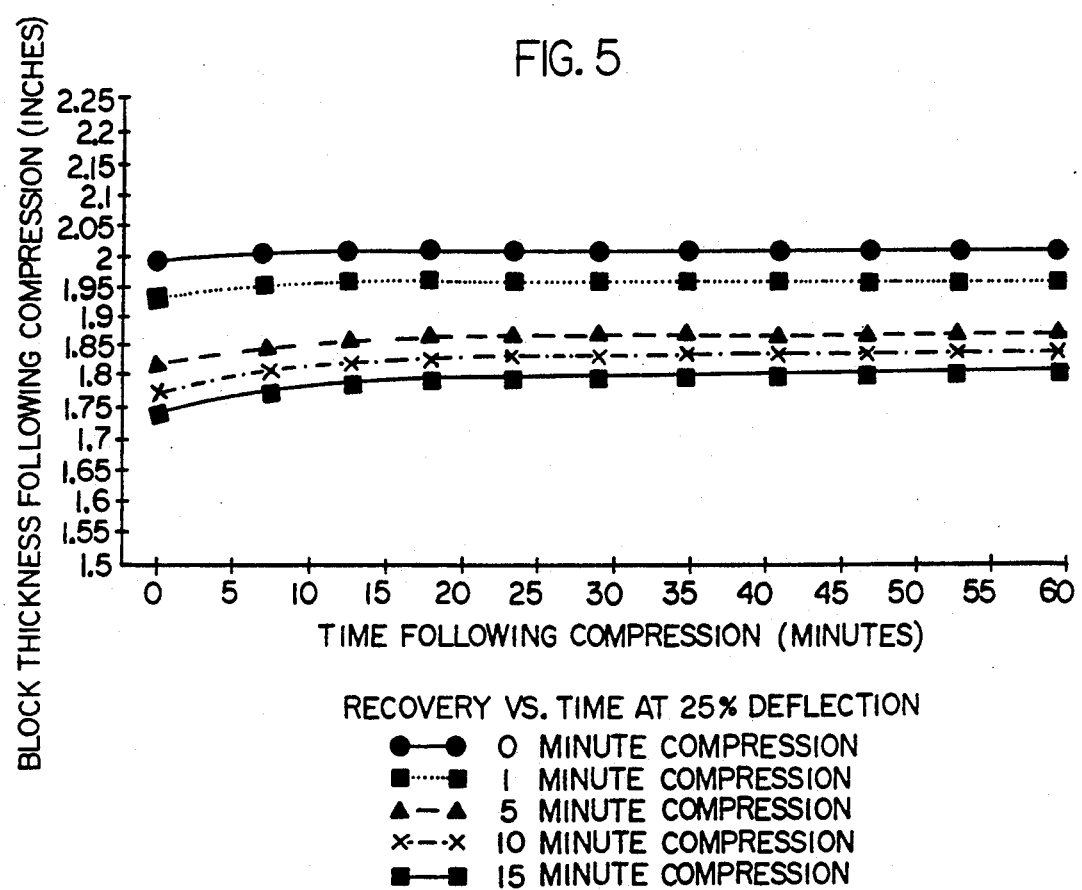
FIG. 5 is a graphical representation of the recovery vs. time at 25% deflection of 1.0# pcf EPS.

The compressing of standard molded EPS is, in accordance with this invention, effected by one of two basic methods. These are basically shown in FIGS. 1 and 2. In accordance with one method, as is shown in FIG. 1, the EPS packaging material 10 is passed through a nip 12 between two opposed rollers 14, 16 and compressed to the desired degree. Generally speaking, the packaging member 10 is substantially instantaneously compressed from a thickness of about 2 inches and released although the time of compressing can be varied slightly by varying the speed at which the packaging material 10 passes between the rollers 14, 16.

In FIG. 2, the second basic method of compressing the EPS packaging material is shown. The packaging material 10 is placed between two flat surfaces 18, 20 which are then moved together as indicated by the associated arrows so as to compress the packaging material 10 to the desired degree. It is to be understood that the packaging material 10 may be maintained in its compressed state for a desired period of time as will be discussed in more detail hereinafter.

In FIGS. 1 and 2, the packaging material 10 is compressed in one dimension only. In FIG. 3 there is illustrated a cube of packaging material 10 which is diagrammatically illustrated as being compressed in all three dimensions. By compressing the packaging material 10 in all three dimensions, a maximum increase in density is obtained.

In FIG. 4 there is illustrated packaging material in the form of a corner member 22. The corner member 22 is shown as being compressed in two dimensions although it is feasible that the corner member 22 may be compressed in only one of the two illustrated dimensions. It is to be understood that the corner member 22 may either be compressed between a plurality of flat surfaces, or between a series of rollers which may have their axes lying either in a single plane or be arranged in series along the direction of movement of the corner member 22.

Figure 6:
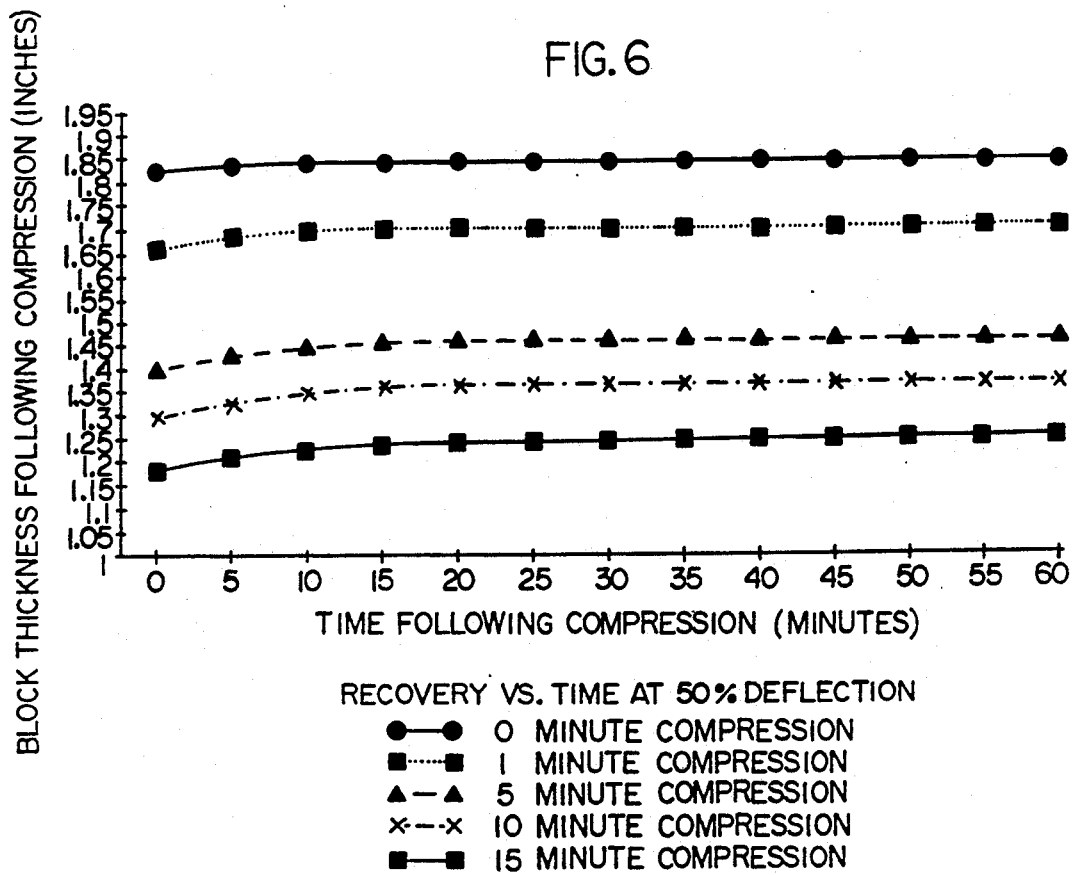
FIG. 6 is a graphical representation of the recovery vs. time at 50% deflection of 1.0# pcf EPS.
Figure 7:
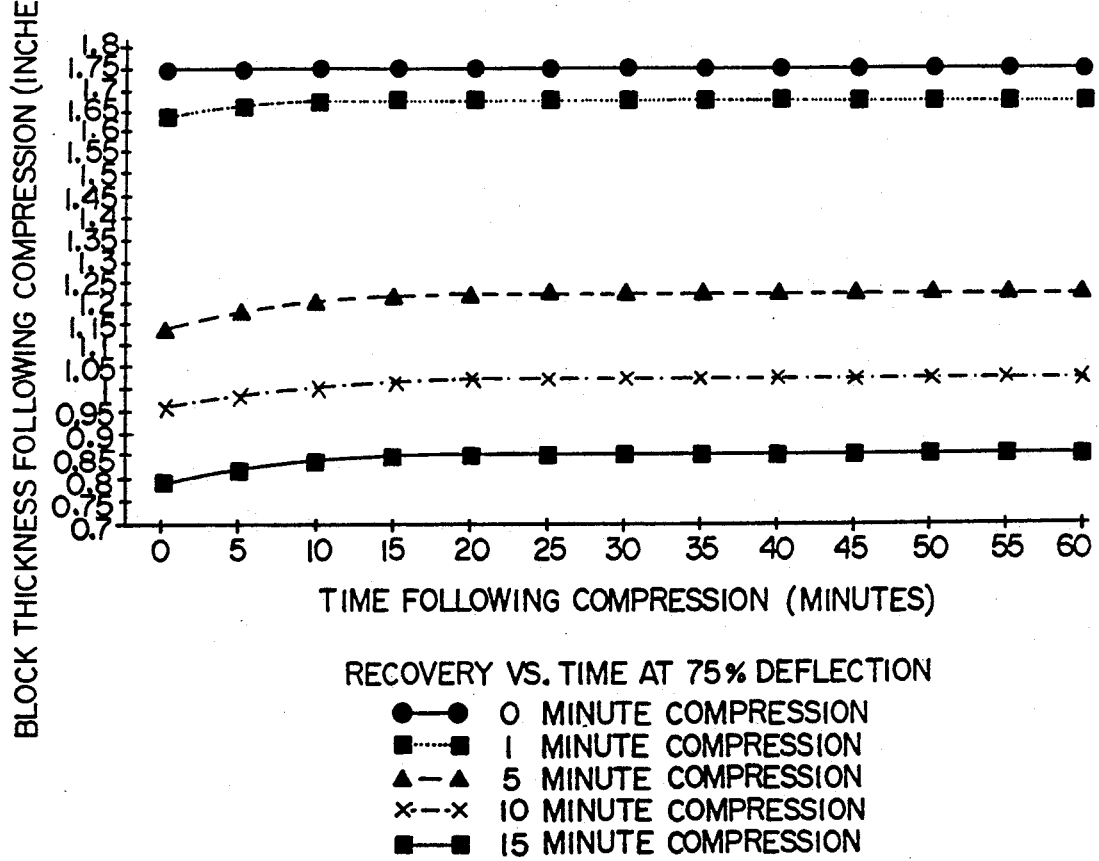
FIG. 7 is a graphical representation of the recovery vs. time at 75% deflection of 1.0# pcf EPS.

FIGS. 5, 6 and 7 illustrate the recovery in 5-minute intervals of 1.0# pcf EPS compressed at different ranges of deflection over varying durations of compression. While the time following compression only extends for 60 minutes, it is to be understood that a 24 hour period of recovery is necessary for the material to realize its new dimension.

Figure 8:
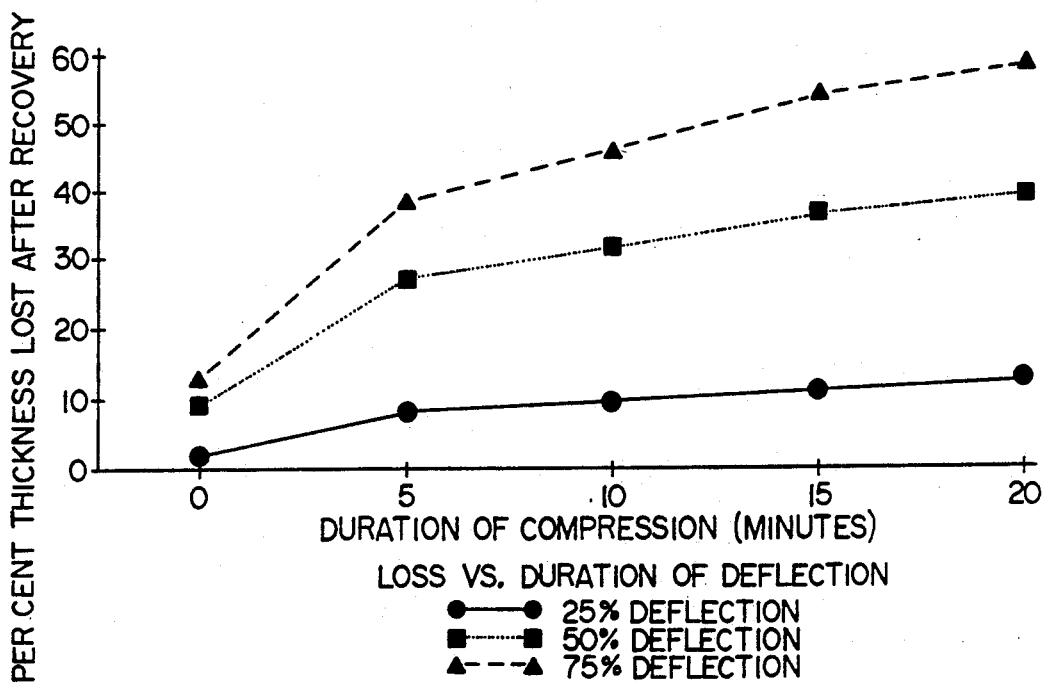
FIG. 8 is a graphical representation of percent thickness loss vs. duration of deflection at 25%, 50%, and 75% deflections of 1.0# pcf EPS.

One my also derive from the data of FIGS. 5, 6 and 7 the overall percent thickness in material loss versus a varying range of deflections over a different range of compression duration. It will be obvious from this data that the greater the percentage of deflection and the greater the duration of compression, the greater the loss in the thickness of the 1.0# pcf EPS as is clearly set forth in Table 1 and FIG. 8.

TABLE 1

OVERALL PERCENT THICKNESS LOST
vs.
DURATION OF COMPRESSION
1.0# pcf EPS

| Time of Compression (Minutes) | Start Block Thickness (Inches) | Block Thickness after Recovery | Overall Percent Thickness Lost |
|---|---|---|---|
| 25% Deflection | | | |
| 0 | 2.041 | 2.005 | 1.764 |
| 1 | 2.036 | 1.960 | 3.733 |
| 5 | 2.039 | 1.874 | 8.092 |
| 10 | 2.034 | 1.844 | 9.341 |
| 15 | 2.032 | 1.816 | 10.630 |
| 20 | 1.972 | 1.721 | 12.728 |
| 50% Deflection | | | |
| 0 | 2.038 | 1.847 | 9.372 |
| 1 | 2.039 | 1.708 | 16.233 |
| 5 | 2.036 | 1.484 | 27.112 |
| 10 | 2.035 | 1.401 | 31.155 |
| 15 | 2.036 | 1.293 | 36.493 |
| 20 | 1.973 | 1.201 | 39.128 |
| 75% Deflection | | | |
| 0 | 2.035 | 1.765 | 13.268 |
| 1 | 2.035 | 1.893 | 16.806 |
| 5 | 2.054 | 1.259 | 38.102 |
| 10 | 2.033 | 1.096 | 46.090 |

TABLE 1-continued

OVERALL PERCENT THICKNESS LOST
vs.
DURATION OF COMPRESSION
1.0# pcf EPS

| Time of Compression (Minutes) | Start Block Thickness (Inches) | Block Thickness after Recovery | Overall Percent Thickness Lost |
|---|---|---|---|
| 15 | 2.035 | .922 | 54.693 |
| 20 | 1.972 | .816 | 58.621 |

Figure 9:
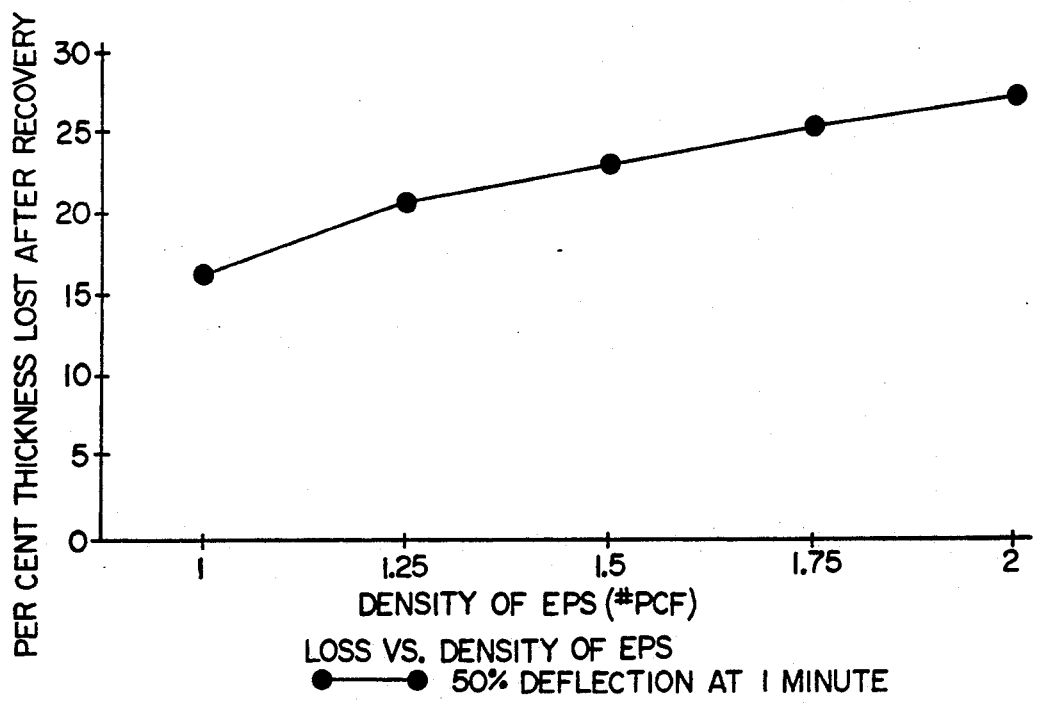
FIG. 9 is a graphical representation of present thickness loss vs. density of EPS at 50% deflection.

By compressing 2.0" thick EPS blocks of different densities at 50% deflection with a one minute duration, it will be seen that an increase in density of the as molded EPS will yield a greater overall percent thickness loss. Attention is particularly directed to Table 2 and FIG. 9.

TABLE 2

OVERALL PERCENT THICKNESS LOST
vs.
DENSITY OF EPS
50% Deflection at 1-Minute Duration

| Density of EPS Compressed | Starting Thickness (Inches) | Thickness Following Recovery | Overall Percent Thickness Lost |
|---|---|---|---|
| 1.0# pcf | 2.039 | 1.708 | 16.184 |
| 1.25# pcf | 2.043 | 1.619 | 20.754 |
| 1.5# pcf | 2.039 | 1.570 | 23.001 |
| 2.0# pcf | 2.040 | 1.523 | 25.324 |

The foregoing data relates to compressing the EPS in one dimension only. It has been found, however, that by compressing the EPS in more than one dimension, one can obtained additional enhancements. Table 3 and FIG. 10 particularly relate to the compressing of 2×2×2 inch blocks of 1.0# pcf molded EPS to 50% deflection for a one minute duration which provides additional enhancements. It is to be noted that Table 3 and FIG. 10 relate to the compressing of the EPS block in one, two and three dimensions. Reference may be had to FIG. 3 with respect thereto. It will be seen that an increase in the number of dimensions compressed will increase the overall percent volume of material lost.

TABLE 3

OVERALL PERCENT VOLUME LOST
vs.
NUMBER OF DIMENSIONS COMPRESSED
1.0# pcf EPS Compressed to 50% Deflection at 1-Minute Duration

| Number of Dimensions Compressed | Starting Dimension (Inches) | Dimensions after Recovery (Inches) | Overall Percent Volume Lost |
|---|---|---|---|
| 1 | 1.971 × 1.970 × 1.972 or 7.657 in.$^3$ | 1.634 × 1.972 × 1.975 or 6.364 in.$^3$ | 16.887 |
| 2 | 1.970 × 1.972 × 1.972 or 7.661 in.$^3$ | 1.784 × 1.661 × 1.981 or 5.870 in.$^3$ | 23.376 |
| 3 | 1.972 × 1.970 × 1.971 or 7.657 in.$^3$ | 1.855 × 1.823 × 1.648 or 5.573 in.$^3$ | 27.217 |

By definition, density is equal to the weight of a mass divided by its volume ($D = W/V$). With this consideration, one can further evaluate the previous information and find that an increase in the number of dimensions compressed will produce an increase in density. It will be seen that the percent increase in density will correspond to the overall percent volume loss as set forth in Table 3.

Figure 10:
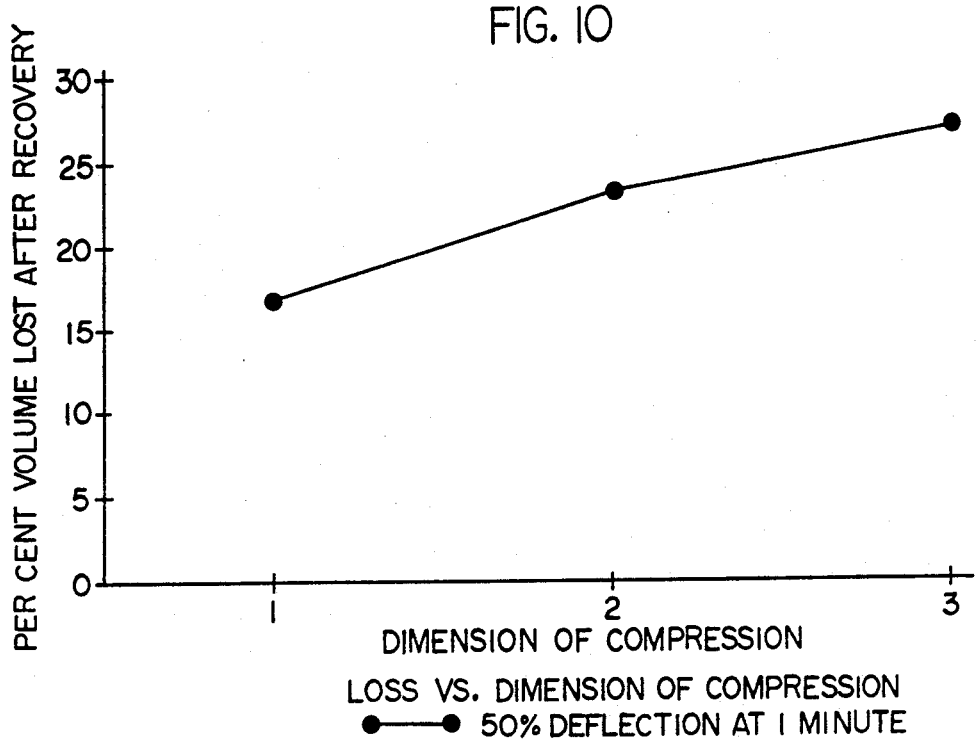
FIG. 10 is a graphical representation of percent thickness loss vs. number of dimensions of compression at 50% deflection of 1.0# pcf EPS.

A charting of the increase in density versus dimension of compression will be the same as that shown in FIG. 10.

As specifically identified hereinabove, the physical properties of molded EPS in packaging applications is a direct reflection of the density of the material. Whether it be for the mechanical, insulation, water absorption or transmission properties, an increase in density allows for more desirable qualities in packaging applications.

In accordance with this invention, it has been found that compression of EPS in the range on the order of 25% to on the order of 75% will produce a packaging material of a desired higher density. Further, it will be seen that the original density of the molded EPS before compression, the amount of deflection of compression, the number of dimensions compressed and the duration of compression will all contribute to an increase in density and results in benefits of the final packaging material produced in accordance with this invention.

With respect to the use of EPS as a packaging material when conditioned in accordance with this invention, improvements in two most critical aspects of a packaging material—cushion qualities and resiliency will be seen.

Figure 11:
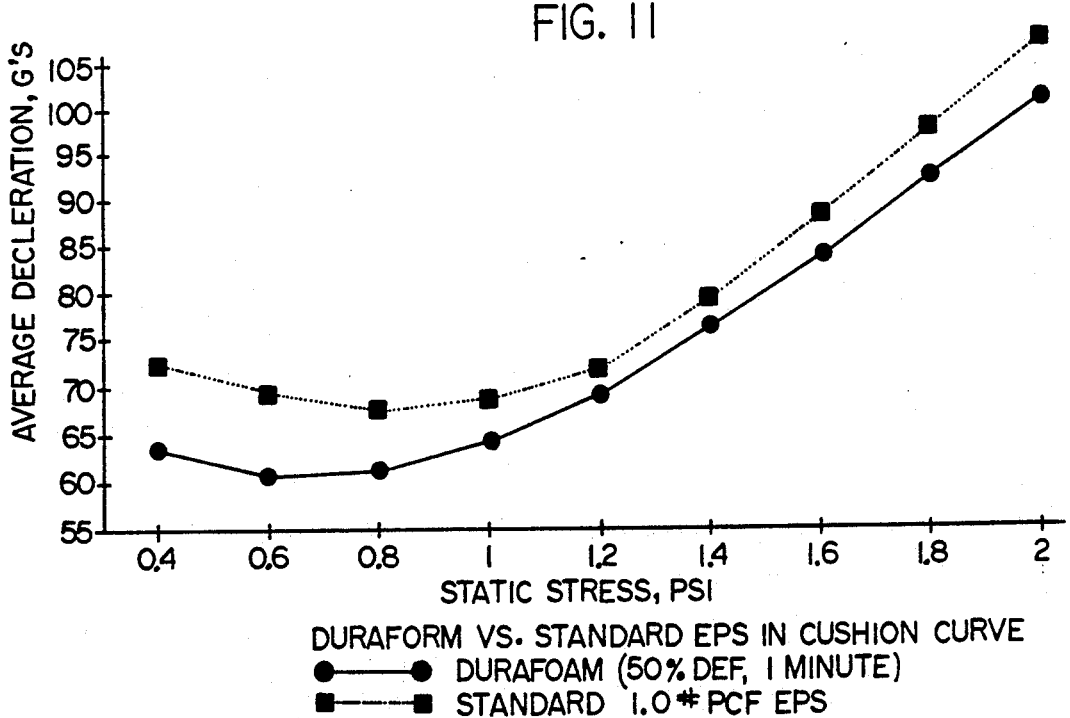
FIG. 11 is a graphical representation of a comparison of the cushioning quality of the present invention to standard, uncompressed 1.0# pcf EPS.

In addressing the cushion qualities, reference is made to an industry standard Dynamic cushion test which measures average deceleration (G's) over static stress (PSI) at a 30 inch drop height. To illustrate the advantages gained by this invention, there has been tested a 2.0 inch thick block of a 1.0# pcf standard molded EPS against that of an example of a processed block of the same thickness and same density, but compressed to 50% deflection for a 1 minute duration. The results of this comparison test are found in Table 4 and FIG. 11.

TABLE 4

DURAFOAM ™
vs.
STANDARD EPS IN CUSHION CURVE
Dynamic Cushion Testing of 2-Inch Material Thickness at 30-Inch Drop

| Material Tested | Static Stress, PSI | Average Deceleration, G's |
|---|---|---|
| 1.0# pcf EPS | 0.4 | 72.5 |
| | 0.8 | 67.5 |
| | 1.2 | 71.5 |
| | 1.6 | 88.0 |
| | 2.0 | 107.0 |
| 1.0# pcf Durafoam (50% Deflection, 1 Minute) | 0.4 | 63.5 |
| | 0.8 | 61.0 |
| | 1.2 | 69.0 |
| | 1.6 | 83.5 |
| | 2.0 | 100.5 |

When considering industry standards, it will be found that the process set forth above will yield a packaging material which will satisfy the needs of a package that would be sensitive in nature over a 0.4 to 1.2 psi statis stress loading; whereas the standard molded EPS would be considered less sensitive in nature over that same static stress loading.

To determine the resiliency gained as a result of the above set forth process, samples of 2.0 inch thick blocks of standard molded EPS were tested against like EPS blocks compressed to 50% deflection for a 1 minute duration to determine overall percent recovery versus impact of varying degrees of deflection over a flat surface. The data set forth in Table 5 and FIG. 11 clearly indicates that the processed EPS not only produces better cushioning characteristics, but also yields a far more resilient material, thus providing a far superior packaging material as compared to that of standard molded EPS.

TABLE 5

OVERALL PERCENT RECOVERY
vs.
IMPACT OF VARYING DEFLECTION

| % Deflection of Impact | Starting Block Thickness (Inches) | Block Thickness after Recovery | Overall Percent Recovery |
|---|---|---|---|
| 1.0# pcf Durafoam (50% Deflection, 1-Minute) | | | |
| 25 | 2.038 | 2.019 | 99.068 |
| 50 | 2.036 | 1.962 | 96.366 |
| 75 | 2.037 | 1.916 | 94.060 |
| 1.0# pcf Standard EPS | | | |
| 25 | 2.041 | 1.997 | 97.844 |
| 50 | 2.038 | 1.847 | 90.628 |
| 75 | 2.035 | 1.765 | 86.732 |

Most particularly, it has been found that the increase of qualities of molded EPS treated in accordance with this invention outweigh the processing costs.

Although only preferred ranges of processing have been specifically disclosed, it is to be understood that minor variations may be made in the process limitations with departing from the spirit and scope of the invention as defined in the appended claims.

It is claimed:

1. A method of increasing the density of molded expanded polystyrene packaging material which has been molded to produce a compressed molded material having improved cushioning characteristics and resiliency than that of the uncompressed molded material, said method comprising the steps of compressing the molded material from a thickness of about 2 inches at least on the order of 1 minute to have a deflection of at least on the order of 50%; and the step of releasing the compressed molded material, said method producing a compressed molded material having at least 90% recovery at an impact of greater than about 50% deflection.

2. The method of claim 1 wherein the step of compressing the molded material includes compressing all of the dimensions of the molded material.

3. The method of claim 1 wherein the step of compressing the molded material is a progressive compression of the molded material.

4. The method of claim 1 wherein the deflection is in the range of on the order of 50% to on the order of 75%.

5. The method of claim 1 wherein the deflection is effected for a period of time ranging from on the order of 1 minute to on the order of 20 minutes.

6. The method of claim 1 wherein the compressing of the molded material is a progressive compressing by passing the molded material through a nip defined by rollers.

7. The method of claim 1 wherein molded material varies in density, and the deflection increases with the density of the molded material.

8. The method of claim 1 wherein the molded material is three dimensional and the compressing is of at least one dimension.

9. The method of claim 1 wherein the molded material is three dimensional and the compressing is of at least two dimensions.

10. The method of claim 1 wherein the molded material is three dimensional and the compressing is of all three dimensions.

* * * * *